May 24, 1927.

S. TRENNER

HÆMACYTOMETER

Filed Aug. 25, 1925

1,630,146

Inventor:—
Simeon Trenner.
by his Attorneys,—
Howson & Howson

Patented May 24, 1927.

1,630,146

UNITED STATES PATENT OFFICE.

SIMEON TRENNER, OF PHILADELPHIA, PENNSYLVANIA, ASSIGNOR TO THE FIRM OF C. A. HAUSSER & SON, OF PHILADELPHIA, PENNSYLVANIA, CONSISTING OF CARL ADOLPH HAUSSER AND ANTHONY ADOLPH HAUSSER.

HÆMACYTOMETER.

Application filed August 25, 1925. Serial No. 52,366.

This invention relates especially to hæmacytometer counting chambers and rulings, and the principal object of the invention is to provide novel orienting means facilitating finding and safely focusing the ruling of the counting chamber under the microscope.

Figure 1:
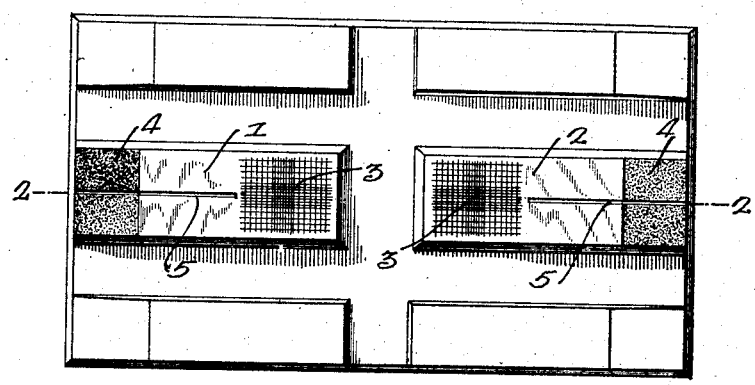
Figure 1 is a plan view of a hæmacytometer counting chamber made in accordance with my invention.
Figure 2:
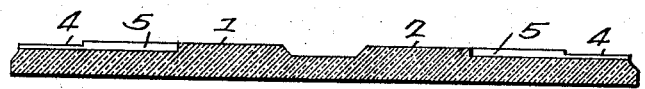
Fig. 2 is a section on the line 2—2, Fig. 1.

With reference to Figs. 1 and 2 of the drawing, the hæmacytometer counting chamber comprises in the present instance two portions 1 and 2 whose surfaces are polished and on which the rulings 3 of the counting chambers are situated. At the outer ends of each of these portions 1 and 2, I provide an area 4 having a matte or unpolished finish, and from each of these unpolished areas I extend a finding line 5 toward the respective rulings 3, 3.

I prefer to form the matte surfaces 4 in a plane slightly below the plane of the rulings 3, and the finding line 5 which may be engraved is of sufficient length, width and depth to render it conspicuous and promptly locatable through the microscope.

In practice, the low power objective may first be focused on one of the matte surfaces 4. The finding line 5 is then located and followed in the direction of the ruling 3 by moving the slide in the same plane by means of the fingers or mechanical stage, with the result that the ruling is located with promptness and certainty. By reason of the approximate coincidence in the plane of the matte surface 4 and the rulings 3 and of the refraction of the emergent light pencils due to the interposition of diluting fluid in the counting chamber, it will then be necessary to focus up, i. e., raise the objective instead of lowering it as is usual where no such focusing surface is utilized, to critically sharpen the approximately focused image of the cells and rulings simultaneously. By this construction and method of procedure, the danger of disturbing the distribution of cells and vitiating the count by touching the cover glass with the microscope objective is obviated, as also is the danger of injuring the objective, cover glass or ruling.

Figure 3:
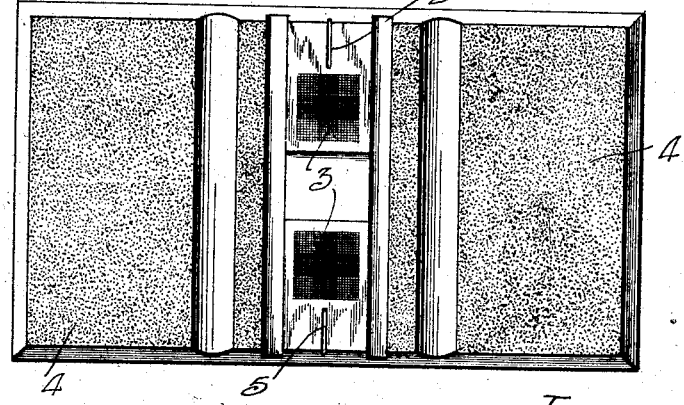
Fig. 3 is a plan view of another form of hæmacytometer also embodying my invention.

There may be considerable variation in the embodiments of the invention, and in Fig. 3 I have shown a counting chamber of different type from that shown in Figs. 1 and 2, to which my invention has been applied. In this case, the matte surfaces 4 upon which the initial focus is made are separate from the polished surfaces upon which the rulings 3 are situated. Each of the polished surfaces, however, is provided with a finding line 5 extending towards the rulings 3, and the procedure is in all essential respects the same as that described in connection with the modification shown in Figs. 1 and 2. After focusing on the outer surface 4, the slide is moved until the line 5 comes within the field of vision, after which the rulings are easily located by moving the slide in the direction indicated by the finder. Here also the matte surfaces 4 are in approximate coincidence with the plane of the rulings 3 and are preferably slightly lower.

I claim:

1. A hæmacytometer counting chamber including a ruled area, a clearly defined and immediately distinguishable surface for focusing, and distinctive guide means extending from said surface in the direction of said ruling.

2. A hæmacytometer counting chamber including a ruled area, well defined and distinctive guide means extending from said ruling, and a clearly defined and immediately distinguishable focusing surface.

3. A hæmacytometer counting chamber including a ruled area and guide means in the form of a marking extending in the direction of said ruling, said marking being well defined and differing from the other markings of the device so as to be readily distinguishable.

4. A hæmacytometer counting chamber including a ruled area and a single line extending as a guide in the direction of said area, said line being well defined and distinctive in appearance so as to be readily distinguishable.

5. A hæmacytometer counting chamber comprising a ruled area, a clearly defined focusing surface, and distinctive guide means intermediate said area and said surface.

6. A hæmacytometer counting chamber including a ruled area, a clearly defined focusing area whose plane substantially coincides with the plane of said rulings and distinctive guide means intermediate said surfaces.

7. A hæmacytometer counting chamber including a translucent member, a polished surface, rulings marked on said surface, a matte surface in a plane substantially coinciding with the plane of said rulings, and a distinctive guide line intermediate said surfaces.

8. A hæmacytometer counting chamber comprising a translucent body having a polished surface, rulings on said surface, a matte surface in a plane substantially coinciding with the plane of said rulings, and a well defined and distinctive line extending from the matte surface toward the rulings.

9. A hæmacytometer counting chamber comprising a ruled area, an unruled area surrounding said ruled area and well defined and distinctive guide means extending across the said unruled area in the direction of said ruling.

SIMEON TRENNER.